Patented Mar. 30, 1948

2,438,716

UNITED STATES PATENT OFFICE 2,438,716

STABILIZED SILVER HALIDE EMULSIONS

Fritz W. H. Mueller, Binghamton, N. Y., assignor to General Aniline & Film Corporation, New York, N. Y., a corporation of Delaware No Drawing. Application October 6, 1944, Serial No. 557,546

5 Claims. (Cl. 95—7)

This invention relates to the improvement of photographic emulsions and more particularly to the incorporation of anti-fogging or stabilizing agents into silver halide emulsions.

A large number of substances have been described as being effective in preventing an increase in fog and thus stabilizing or controlling the keeping quality of photographic emulsions. Many of these stabilizers have definite limitations in their ability to produce desirable effects without producing unfavorable side reactions. Thus, some stabilizers desensitize or produce fog, when added during the mixing or ripening, but exert favorable effects when added to the melted emulsion before coating. It is one object of this invention, therefore, to produce a stabilizing emulsion of improved photographic quality while incorporating the stabilizing agents over a wider range of application during the manufacture of photographic emulsions.

In U. S. Patent 2,057,764 there is described a process of stabilizing photographic silver halide emulsions by incorporating sulfinic or seleninic acids or their salts into the emulsion in the form of a solution in a suitable solvent during the preparation of the emulsion or by incorporating the stabilizer into the finished emulsion by bathing the emulsion layer with a weak solution of the stabilizer. It was found that the fogging influence of supports, preparation layers, backing layers, intermediate layers, sublayers, protective layers, or baryta layers could be prevented by incorporating these stabilizers into such layers. As compared with films which were not provided with the sulfinic acid or seleninic acid stabilizers, it is stated that the films containing the stabilizer showed a reduction in fog density of approximately 50%. It has now been discovered that the stabilizing effect of the sulfinic or the seleninic acids or their salts, disclosed in U. S. Patent 2,057,764 can be considerably improved and the range of application greatly extended if small amounts of cystine or certain substituted cystine compounds are present in the emulsions containing the sulfinates or seleninates. Compounds of this type may have the formulae:

Group I $$CH_2-S-S-CH_2$$
$$\underset{R_1}{\overset{R}{\underset{|}{HC-N}}}\quad \underset{R_1}{\overset{R}{\underset{|}{CH-N}}}$$
$$COOH \quad COOH$$

R=H or alkyl
R₁=H or acetyl, benzoyl, brompropionyl, chloroacetyl, carbaminyl, phenylacetyl, α-amino propionyl, carbo-benzoxy, benzo-sulfonyl, guanyl $$\left[-C\underset{NH_2}{\overset{NH}{\diagdown}}\right]$$

Group II $$CH_2-S-S-CH_2$$
$$\underset{COOH}{\overset{HC-N=R_3}{|}}\quad \underset{COOH}{\overset{CH-N=R_3}{|}}$$

R₃ represents =CH—⟨phenyl⟩ or substituted benzylidene.

Group III $$CH_2-S-S-CH_2$$
$$HC\underset{Y}{\overset{N}{\diagdown}}\quad N\overset{CH}{\diagup}$$

Y=atoms to complete a heterocyclic substituted or unsubstituted 5 or 6 ring.

It has been observed that extremely small quantities of the cystine or such substituted cystine compounds will improve the stabilizing characteristic of photographic emulsions containing a sulfinate or seleninate to an extent unobtainable with a sulfinate or seleninate alone. Thus, the photographic effect of sodium sulfinate or seleninate is improved by the addition of 0.00025–0.0050 mols per mol of sulfinate or seleninate of such cystine or cystine derivatives as Group I:
  Cystine
  Dicarbobenzoxy-cystine
  Di-N-benzyl-dibenzenesulfonyl cystine
  Diguanyl cystine (=diguanidine dithio dilactylic acid)
  Di-glycyl-cystine
  Dichloroacetyl cystine
Group II: Dibenzylidene cystine (barium salt)
Group III:
  Dialanyl cystine anhydride
  Diguanyl cystine anhydride
  Cystine hydantoin
  Cystine phenyl hydantoin
  Cystine-bis-1-acetyl-2-thiohydantoin The improved result, expressing fog in terms of density units, is manifested in a reduction of the fog density of approximately two-thirds of the fog density obtained when using a sulfinate or seleninate alone. This reduction in fog density produces better clearness, better keeping quality and an unusual brilliance which is especially desirable in medical and industrial radiographs. These improved stabilizing or antifogging effects of cystine compounds when used with the sulfinate or seleninate stabilizers were particularly surprising in view of the well-known strong desensitizing action of cystine in photographic emulsions.

The same reduction in fog density is obtained whether the cystine or substituted cystine compound is added with the sulfinate or seleninate during mixing or during the ripening stage in the process of making the silver halide emulsion or to the molten emulsion prior to coating. In the latter case, solvents for the stabilizer mixture are employed which do not affect emulsions such as water or organic solvents which are miscible with water, for instance, alcohol. The stabilizing mixture of the sulfinic acid salt or seleninic acid salt and the cystine compound may also be employed in preparation layers, backing layers, intermediate layers, sublayers, protective layers, and baryta layers in order to prevent the fogging influence of such layers.

Without in any way wishing to be bound by or limited to any particular theory as to the mechanism of the additional stabilizing effect produced by the cystine or substituted cystine, it is believed that this additional stabilizing effect is either a catalytic one or is due to a chemical interaction between the cystine compound and the sulfinate or seleninate with the possible production of a reaction product which exerts the enhanced stabilizing influence on the silver halide emulsion.

This enhanced stabilizing effect of the cystine compounds depends to some extent on the pH of the emulsion. Certain cystine derivatives were found preferable in acid emulsion, others gave optimum results in ammonia type emulsions. It also was found to be preferable in activating solutions of sodium benzene sulfinate to add traces of cystine derivatives to the solution and heat it for 30 minutes at 50° C. The following examples will serve to further illustrate the invention, it being understood that the invention is not limited thereto:

*Example I*

To 1 kilogram of a gelatin-silver-halide emulsion containing from 6 to 7% of silver halide and approximately 8% gelatin there were added during the ripening stage at a pH of approximately 8.0:

15 cc. of a 20% solution of sodium benzene sulfinate, and
25 cc. of a solution of 1-cystine (1 gram dissolved in 1 liter water containing 1 cc. of 3-N sodium carbonate).

The melted emulsion was cast on a film base and cut into test film lengths. Similar test films were made with the same silver halide emulsion but omitting the addition of the sodium benzene sulfinate. Additional similar test films were made with the same silver halide emulsion to which had been added during ripening the same quantity of the sodium benzene sulfinate as above but omitting the 1-cystine.

The fog density of each of these types of test film was determined for the freshly prepared film and test pieces of each type were then incubated for a period of six days at 50° C. It was observed that the fog density of the films treated with benzene sulfinic acid to which had been added 1-cystine was reduced by approximately 67% in the case of freshly coated film and 65% after incubation of the fog density of the films which had been treated with sodium benzene sulfinate alone. The treatment with 1-cystine alone was known to cause a severe desensitization.

*Example II*

To 1 kilogram of a gelatin-silver-halide emulsion containing from 6 to 7% of silver halide and approximately 8% gelatin there were added during the ripening stage at a pH of approximately 8.0:

15 cc. of a 20% solution of sodium benzene seleninate, and
3 cc. of a solution of 1-cystine phenyl hydantoin (1.7 gram dissolved in 1 liter of 75% methyl alcohol).

The melted emulsion was then cast on a film base and cut into test film lengths. Additional similar test films were made with the same silver halide emulsion to which had been added during ripening the same quantity of the sodium benzene seleninate as above but omitting the 1-cystine phenyl hydantoin.

The fog density of each of these types of test film was determined for the freshly prepared film and test pieces of each type were then incubated for a period of six days at 50° C. It was observed that the fog density of the films treated with benzene seleninic acid to which had been added 1-cystine was reduced by about 67% in the case of freshly prepared film and 65% after incubation of the fog density of the films which had been treated with benzene seleninic acid alone.

*Example III*

To a gelatin-silver-halide emulsion containing silver halide corresponding to 100 g. of silver nitrate, there were added after precipitation of the silver halide and prior to the first digestion:

90 cc. of a 20% solution of sodium benzene sulfinate and
20 cc. of a solution consisting of 1 g. of α-diguanyl cystine in 5 cc. of 1/N-sodium hydroxide made up in 1 liter of water.

The pH of the emulsion was approximately 6.5. The emulsion was washed and after-ripened in the usual manner. Samples of this emulsion were compared for clearness and keeping quality with samples of an emulsion prepared in the same manner but omitting the α-diguanyl cystine solution. It was found that the emulsion containing the cystine derivative was considerably improved.

*Example IV*

To 1 kilogram of a gelatin-silver-halide emulsion containing 6 to 7% of silver halide and 8% gelatin, there was added as a coating final:

15 cc. of a 20% aqueous solution of sodium benzene sulfinate, and
2.5 cc. of a solution consisting of 1 g. of the barium salt of dibenzylidene cystine in 1 liter of water.

This emulsion was compared with an emulsion made in the same manner but omitting the dibenzylidene cystine and found to be considerably improved in its clearness and keeping qualities.

Example V

A stabilizing solution was made up as follows:

15 mg. of diguanyl cystine anhydride dissolved in a small amount of methyl alcohol was added to 100 cc. of a 20% aqueous solution of crystalline sodium benzene sulfinate.

The mixture was heated for thirty minutes at 50° C.

This solution was then used as a stabilizer by adding 15 cc. of the solution per kilogram of silver-halide-gelatin emulsion containing 6 to 7% silver halide and 8% gelatin during various stages of the making and ripening of the emulsion and as a coating final.

In all cases, it was found that the clearness of the emulsion was considerably improved as compared with a similar emulsion which did not contain the diguanyl cystine anhydride. Also it was found that the fog increased to a much less degree upon subsequent storage in the case of the emulsion of this example than if sodium benzene sulfinate was used without the cystine derivative.

Other cystine derivatives such as those specifically listed above can be substituted in equimolecular amounts for the diguanyl cystine anhydride of this example with similar results.

The improvement obtainable when the fog characteristic is expressed in density units will, of course, vary somewhat depending upon the type of gelatin and the formula used in making the gelatino-silver-halide emulsion. The following table which expresses average fog values based upon the tests referred to in the examples will serve to further illustrate the improvement which is achieved by using the cystine or substituted cystine compound in combination with the sulfinates or seleninates as additions to typical gelatin-silver-halide emulsions:

| Type of Film | Fog of the Freshly Coated Film | Fog after 6 days Incubation at 50° C. |
| --- | --- | --- |
| | Density Units | |
| Film with the addition of sodium benzene seleninate or sulfinate as a coating final | 0.25-0.30 | 0.25-0.35 |
| Film with the addition of sodium benzene seleninate or sulfinate and cystine or cystine derivatives | 0.12-0.15 | 0.15-0.19 |
| Film made from emulsion to which had been added sodium seleninate or sulfinate during ripening | 0.38-0.45 | 0.45-0.55 |
| Film made from emulsion to which had been added during the ripening sodium seleninate or sulfinate in combination with cystine or cystine derivatives | 0.12-0.15 | 0.15-0.19 |

What I claim as my invention and desire to be secured by Letters Patent of the United States is:

1. A photographic material comprising a silver halide gelatin emulsion in contact with a member of the group consisting of a sulfinic acid, a seleninic acid and their salts, and a cystine compound selected from the group consisting of such compounds having the formulae:

I.
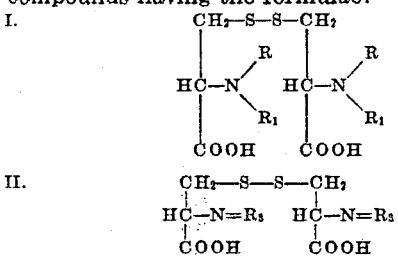

II.

III.

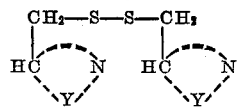

wherein R stands for a member of the group consisting of hydrogen and alkyl; $R_1$ stands for a member of the group consisting of hydrogen, acetyl, benzoyl, brom-propionyl, chloroacetyl, carbaminyl, phenylacetyl, α-amino propionyl, carbo-benzoxy, benzo-sulfonyl, and guanyl radicals; $R_3$ stands for a member of the group consisting of benzylidene and substituted benzylidene radicals; and Y represents the atoms necessary to complete a heterocyclic ring system, in the proportion of from 0.00025 to 0.0050 mol of the member of the last named group to one mol of the member of the first named group.

2. A photographic material comprising a silver halide gelatin emulsion containing a member of the group consisting of a sulfinic acid, a seleninic acid and their salts, and a cystine compound selected from the group consisting of such compounds having the formulae:

I.
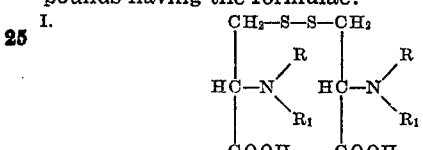

II.
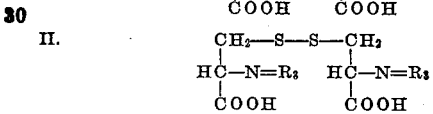

and
III.
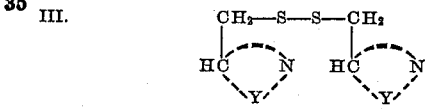

wherein R stands for a member of the group consisting of hydrogen and alkyl; $R_1$ stands for a member of the group consisting of hydrogen, acetyl, benzoyl, brom-propionyl, chloroacetyl, carbaminyl, phenylacetyl, α-amino propionyl, carbo-benzoxy, benzo-sulfonyl, and guanyl radicals; $R_3$ stands for a member of the group consisting of benzylidene and substituted benzylidene radicals; and Y represents the atoms necessary to complete a heterocyclic ring system, in the proportion of from 0.00025 to 0.0050 mol of the member of the last named group to one mol of the member of the first named group.

3. A photographic material comprising a silver halide gelatin emulsion in contact with a member of the group consisting of a sulfinic acid, a seleninic acid and their salts, and 1-cystine in the proportion of from 0.00025 to 0.0050 mol of the 1-cystine to one mol of the selected member of said group.

4. A photographic material comprising a silver halide gelatin emulsion in contact with a member of the group consisting of a sulfinic acid, a seleninic acid and their salts, and α-diguanyl cystine in the proportion of from 0.00025 to 0.0050 mol of the α-diguanyl cystine to one mol of the selected member of said group.

5. A photographic material comprising a silver halide gelatin emulsion in contact with a member of the group consisting of a sulfinic acid, a seleninic acid and their salts, and dibenzylidene cystine in the proportion of from 0.00025 to 0.0050 mol of the dibenzylidene cystine to one mol of the selected member of said group.

FRITZ W. H. MUELLER.

(References on following page)

REFERENCES CITED

The following references are of record in the file of this patent:

UNITED STATES PATENTS

| Number | Name | Date |
|---|---|---|
| 2,057,764 | Brunken | Oct. 20, 1936 |

FOREIGN PATENTS

| Number | Country | Date |
|---|---|---|
| 773,294 | France | Aug. 27, 1934 |
| 186,864 | Switzerland | Dec. 16, 1936 |
| 186,865 | Switzerland | Dec. 16, 1936 |